| | | |
|---|---|---|
| (12) | United States Patent<br>Tsubone | (10) Patent No.: US 11,144,276 B2<br>(45) Date of Patent: *Oct. 12, 2021 |

(54) COMMUNICATION TERMINAL, MANAGEMENT SYSTEM, COMMUNICATION SYSTEM, AND DISPLAY METHOD

(71) Applicant: RICOH COMPANY, LTD., Tokyo (JP)

(72) Inventor: Shuhei Tsubone, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/984,236

(22) Filed: Aug. 4, 2020

(65) Prior Publication Data

US 2020/0364019 A1 Nov. 19, 2020

Related U.S. Application Data

(63) Continuation of application No. 15/835,509, filed on Dec. 8, 2017, now Pat. No. 10,789,035, which is a (Continued)

(30) Foreign Application Priority Data

Jun. 23, 2015 (JP) ................................ 2015-125402

(51) Int. Cl.
*G06F 3/147* (2006.01)
*G06F 3/14* (2006.01)
(Continued)

(52) U.S. Cl.
CPC ............ *G06F 3/147* (2013.01); *G06F 3/0488* (2013.01); *G06F 3/04883* (2013.01); *G06F 3/14* (2013.01);
(Continued)

(58) Field of Classification Search
CPC ............ G06F 13/00; G06F 2203/0383; G06F 3/0488; G06F 3/04883; G06F 3/14;
(Continued)

(56) References Cited

U.S. PATENT DOCUMENTS 6,961,912 B2  11/2005  Aoki
7,277,845 B2  10/2007  Chino
(Continued)

FOREIGN PATENT DOCUMENTS

EP   2 654 240 A1   10/2013
JP   2010026701 A   2/2010
(Continued)

OTHER PUBLICATIONS

International Search Report dated Jul. 12, 2016 in PCT/JP2016/067086 filed on Jun. 8, 2016 (with English Translation).
(Continued)

*Primary Examiner* — Michael J Jansen, II
(74) *Attorney, Agent, or Firm* — Xsensus LLP

(57) ABSTRACT

A communication terminal for communicative connection to at least one other communication terminal via a network includes a receiving part configured to receive stroke data transmitted from the other communication terminal, an obtaining part configured to obtain name information that is associated with a transmission source of the stroke data under management by a management system on the network, and a display control part configured to perform control that displays an image based on the stroke data and an image based on the obtained name information in association with each other.

9 Claims, 13 Drawing Sheets

Related U.S. Application Data continuation of application No. PCT/JP2016/067086, filed on Jun. 8, 2016.

(51) Int. Cl.
  *H04N 1/04* (2006.01)
  *H04N 1/12* (2006.01)
  *H04N 1/32* (2006.01)
  *G06F 3/0488* (2013.01)
  *H04N 1/00* (2006.01)
  *G06F 13/00* (2006.01)

(52) U.S. Cl.
  CPC ......... *G06F 13/00* (2013.01); *H04N 1/00392* (2013.01); *H04N 1/04* (2013.01); *H04N 1/1255* (2013.01); *H04N 1/32144* (2013.01); *G06F 2203/0383* (2013.01); *H04N 2201/0438* (2013.01); *H04N 2201/3245* (2013.01)

(58) Field of Classification Search
  CPC ........... G06F 3/147; G06F 2203/04102; G06F 3/03545; G06F 3/0383; G06F 3/041; G06F 3/0412; G06F 3/0414; G06F 3/0416; G06F 3/044; G06F 3/046
  See application file for complete search history.

(56) References Cited

U.S. PATENT DOCUMENTS

| | | | |
|---|---|---|---|
| 7,299,405 B1 | 11/2007 | Lee | |
| 7,770,126 B2 | 8/2010 | Townsend | |
| 7,996,776 B2 | 8/2011 | Parker | |
| 8,482,539 B2 | 7/2013 | Ogawa | |
| 9,335,860 B2 | 5/2016 | Nagahara | |
| 9,430,065 B2 | 8/2016 | Petkov | |
| 9,448,648 B2 | 9/2016 | Angelov | |
| 9,495,065 B2 | 11/2016 | Thomas | |
| 9,596,435 B2 | 3/2017 | Nagahara | |
| 9,619,051 B2 | 4/2017 | Ryshtun | |
| 9,766,804 B2 | 9/2017 | Angelov | |
| 9,846,494 B2 | 12/2017 | Masuda | |
| 9,866,611 B2 | 1/2018 | Omura | |
| 9,875,021 B2 | 1/2018 | Petkov | |
| 9,898,241 B2 | 2/2018 | Nagahara | |
| 9,904,465 B2 | 2/2018 | Angelov | |
| 9,904,466 B2 | 2/2018 | Angelov | |
| 9,977,519 B2 | 5/2018 | Lukanc | |
| 10,078,445 B2 | 9/2018 | Petkov | |
| 10,175,928 B2 | 1/2019 | Tamura | |
| 10,191,653 B2 | 1/2019 | Angelov | |
| 10,198,177 B2 | 2/2019 | Watanabe | |
| 10,289,221 B2 * | 5/2019 | Kagami | G06F 3/0441 |
| 10,297,058 B2 | 5/2019 | Oikawa | |
| 10,324,547 B2 * | 6/2019 | Han | G06F 3/0442 |
| 10,331,338 B2 | 6/2019 | Petkov | |
| 10,346,121 B2 | 7/2019 | Tsubone | |
| 10,356,361 B2 | 7/2019 | Kato | |
| 10,401,985 B2 * | 9/2019 | Hara | G06F 3/044 |
| 10,409,484 B2 | 9/2019 | Angelov | |
| 10,452,168 B2 * | 10/2019 | Oda | G06F 3/04162 |
| 10,474,286 B2 * | 11/2019 | Bae | G06F 3/0441 |
| 10,534,530 B2 | 1/2020 | Angelov | |
| 10,627,927 B2 * | 4/2020 | Yamamoto | G06F 3/0446 |
| 10,761,619 B2 * | 9/2020 | Park | G08C 17/02 |
| 10,768,805 B2 * | 9/2020 | Angelov | G06K 9/52 |
| 10,789,035 B2 * | 9/2020 | Tsubone | G06F 3/14 |
| 2003/0016253 A1 | 1/2003 | Aoki | |
| 2003/0097250 A1 | 5/2003 | Chino | |
| 2007/0192731 A1 | 8/2007 | Townsend | |
| 2007/0204047 A1 | 8/2007 | Parker | |
| 2011/0169756 A1 | 7/2011 | Ogawa | |
| 2013/0135346 A1 | 5/2013 | Sakuramata | |
| 2013/0271403 A1 | 10/2013 | Nagahara | |
| 2014/0013284 A1 | 1/2014 | Thomas | |
| 2014/0280458 A1 | 9/2014 | Kasatani | |
| 2015/0062094 A1 | 3/2015 | Ryshtun | |
| 2015/0067532 A1 | 3/2015 | Omura | |
| 2015/0077369 A1 | 3/2015 | Nagahara et al. | |
| 2015/0309765 A1 | 10/2015 | Nagahara | |
| 2015/0338941 A1 | 11/2015 | Masuda | |
| 2015/0371417 A1 | 12/2015 | Angelov | |
| 2015/0378450 A1 | 12/2015 | Petkov | |
| 2016/0170704 A1 | 6/2016 | Tamura | |
| 2016/0224239 A1 | 8/2016 | Angelov | |
| 2016/0227170 A1 | 8/2016 | Nagahara | |
| 2016/0246390 A1 | 8/2016 | Lukanc | |
| 2016/0253090 A1 | 9/2016 | Angelov | |
| 2016/0328145 A1 | 11/2016 | Petkov | |
| 2016/0328624 A1 | 11/2016 | Angelov | |
| 2016/0328625 A1 | 11/2016 | Angelov | |
| 2017/0053427 A1 | 2/2017 | Oikawa | |
| 2017/0192534 A1 * | 7/2017 | Han | G06F 3/0383 |
| 2017/0220138 A1 * | 8/2017 | Kagami | G06F 3/0383 |
| 2017/0220313 A1 | 8/2017 | Tsu Bone | |
| 2017/0285772 A1 * | 10/2017 | Yamamoto | G06F 3/0442 |
| 2018/0004407 A1 * | 1/2018 | Angelov | G06F 3/0412 |
| 2018/0018085 A1 | 1/2018 | Watanabe | |
| 2018/0046272 A1 * | 2/2018 | Hara | G06F 3/0441 |
| 2018/0052532 A9 * | 2/2018 | Kagami | G06F 3/03545 |
| 2018/0084222 A1 | 3/2018 | Kato | |
| 2018/0101299 A1 | 4/2018 | Petkov | |
| 2018/0101349 A1 | 4/2018 | Tsubone | H04N 1/32144 |
| 2018/0113559 A1 * | 4/2018 | Bae | G06F 3/03545 |
| 2018/0157341 A1 * | 6/2018 | Oda | G06F 3/03545 |
| 2018/0188836 A1 * | 7/2018 | Park | G06F 3/0442 |
| 2018/0203599 A1 | 7/2018 | Angelov | |
| 2019/0050143 A1 | 2/2019 | Petkov | |
| 2019/0155498 A1 | 5/2019 | Angelov | |
| 2019/0310769 A1 | 10/2019 | Petkov | |
| 2020/0019306 A1 | 1/2020 | Angelov | |
| 2020/0364019 A1 * | 11/2020 | Tsubone | G06F 3/147 |

FOREIGN PATENT DOCUMENTS

| | | |
|---|---|---|
| JP | 5081088 | 11/2012 |
| JP | 2013-065125 | 4/2013 |
| JP | 2014-149714 | 8/2014 |
| JP | 2014-236336 | 12/2014 |

OTHER PUBLICATIONS

Written Opinion dated Jul. 12, 2016 in PCT/JP2016/067086 filed on Jun. 8, 2016.

Extended European Search Report dated May 23, 2018 in Patent Application No. 16814167.9, 7 pages.

* cited by examiner

COMMUNICATION TERMINAL, MANAGEMENT SYSTEM, COMMUNICATION SYSTEM, AND DISPLAY METHOD

CROSS-REFERENCE TO RELATED APPLICATIONS

The present application is a continuation application of U.S. application Ser. No. 15/835,509, filed Dec. 8, 2017, which is a continuation application of International Application No. PCT/JP2016/067086, filed on Jun. 8, 2016, which claims priority to Japanese Patent Application No. 2015-125402, filed on Jun. 23, 2015. The contents of these applications are incorporated herein by reference in their entirety.

BACKGROUND OF THE INVENTION

1. Field of the Invention

The disclosures herein generally relate to a communication terminal, a management system, a communication system, and a display method.

2. Description of the Related Art

Communication systems that provide a telephone call, a video conference, and the like via a communication network such as the Internet or a dedicated line have become prevalent in recent years due to a demand for reducing travel costs and time of parties. Such communication systems transmit/receive content data when communication is initiated between communication terminals. This makes communication between locations possible. Moreover, in order to enable smooth communication between locations, a method for sharing stroke data generated based on a handwriting operation as content data between the locations has been proposed.

For example, Patent Document 1 discloses a terminal apparatus in which location information such as an operator is stored in association with location identification information. When such a terminal apparatus receives handwritten data from another terminal apparatus, identification information is attached to the handwritten data and location information associated with the location identification information is obtained. This allows the received handwritten data to be displayed along with location information such as an operator.

However, in a case where communication is made with a communication partner whose name is not managed by a communication terminal, including for example, a first-time communication partner, the name of the communication partner cannot be displayed in association with stroke data when the stroke data is transmitted by the communication partner. Therefore, there is a problem with insufficient flexibility in displaying location information.

RELATED ART DOCUMENT

[Patent Document 1] Japanese Patent No. 5081088

SUMMARY OF THE INVENTION

According to one embodiment, a communication terminal for communicative connection to at least one other communication terminal via a network includes a receiving part configured to receive stroke data transmitted from the other communication terminal, an obtaining part configured to obtain name information that is associated with a transmission source of the stroke data under management by a management system on the network, and a display control part configured to perform control that displays an image based on the stroke data and an image based on the obtained name information in association with each other.

DESCRIPTION OF THE PREFERRED EMBODIMENTS

In the following, embodiments of the present invention will be described with reference to the accompanying drawings.

<<General Arrangement of Embodiment>>

Figure 1:
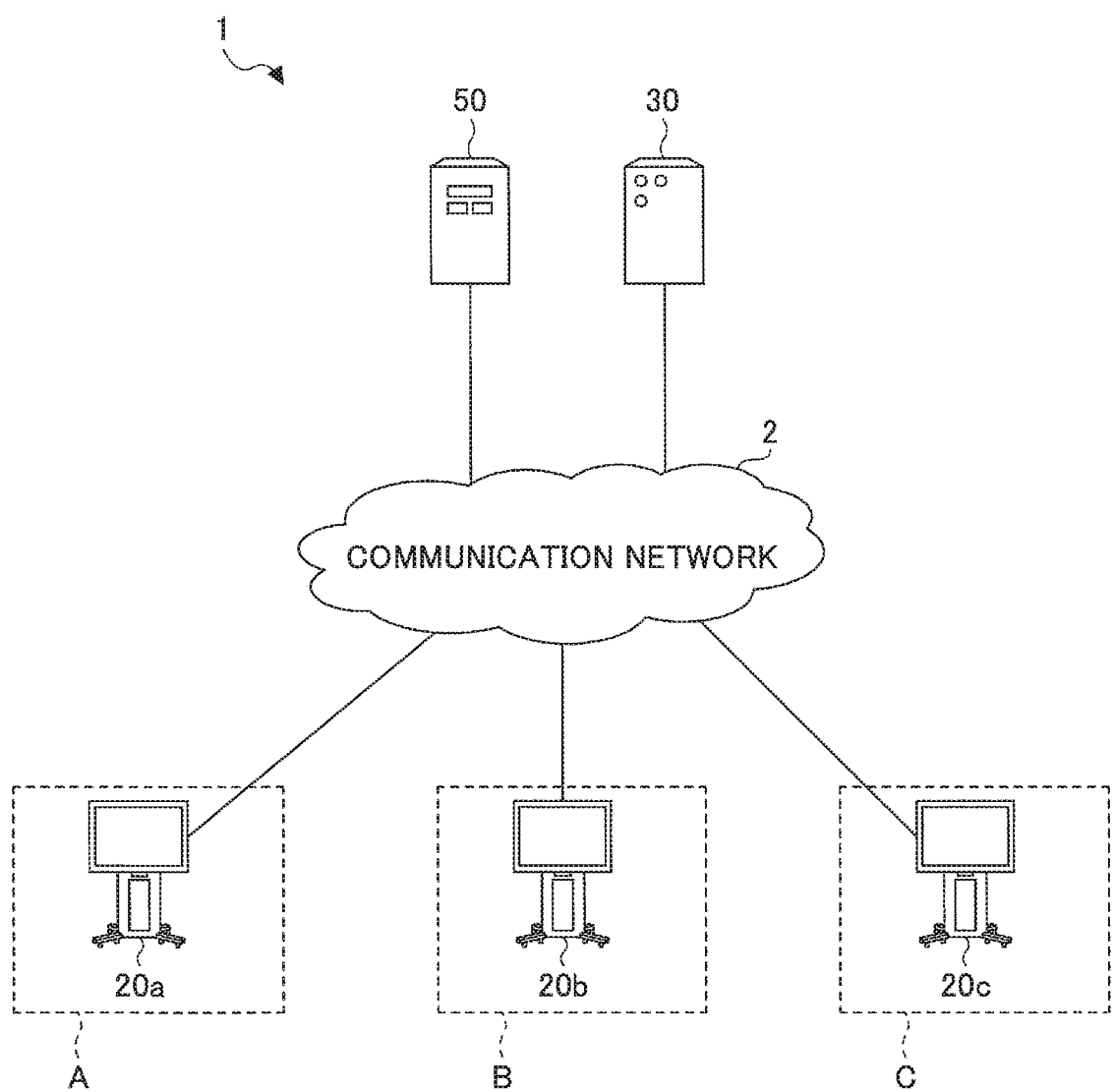
FIG. 1 is a schematic view of a communication system of an embodiment.

FIG. 1 is a schematic view of a communication system of an embodiment of the present invention. As illustrated in FIG. 1, a communication system 1 includes interactive whiteboards (20a, 20b, and 20c) (hereinafter referred to as "IWBs") as an example of a stroke sharing apparatus, a relay apparatus 30 configured to relay stroke data transmitted between the IWBs (20a, 20b, and 20c), and a management system 50 configured to manage communication between the IWBs (20a, 20b, and 20c). Hereinafter, an arbitrary IWB of the IWBs (20a, 20b, and 20c) is represented as an IWB 20. The management system 50 is a computer provided with a server function.

The communication system 1 allows strokes in which a character, a figure, a symbol, and the like are drawn to be shared between the IWBs (20a, 20b, and 20c).

Moreover, the IWB 20, the relay apparatus 30, and the management system 50 are communicatively connected to one another via a communication network 2 such as the Internet, a mobile phone network, or a local area network (LAN). A single IWB 20 is placed at the locations (A, B, and C), respectively. By using the IWB 20, a video conference between locations can be performed. Also, FIG. 1 illustrates that a single IWB 20 is placed at the locations (A, B, and C), respectively, but a plurality of IWBs 20 may be placed at the locations (A, B, and C), respectively. In addition, communication terminals other than the IWBs 20 such as video conference terminals, projectors, and digital signage devices may be placed for communication with one another via the communication network 2.

<<Hardware Configuration of Embodiment>>

Figure 2:
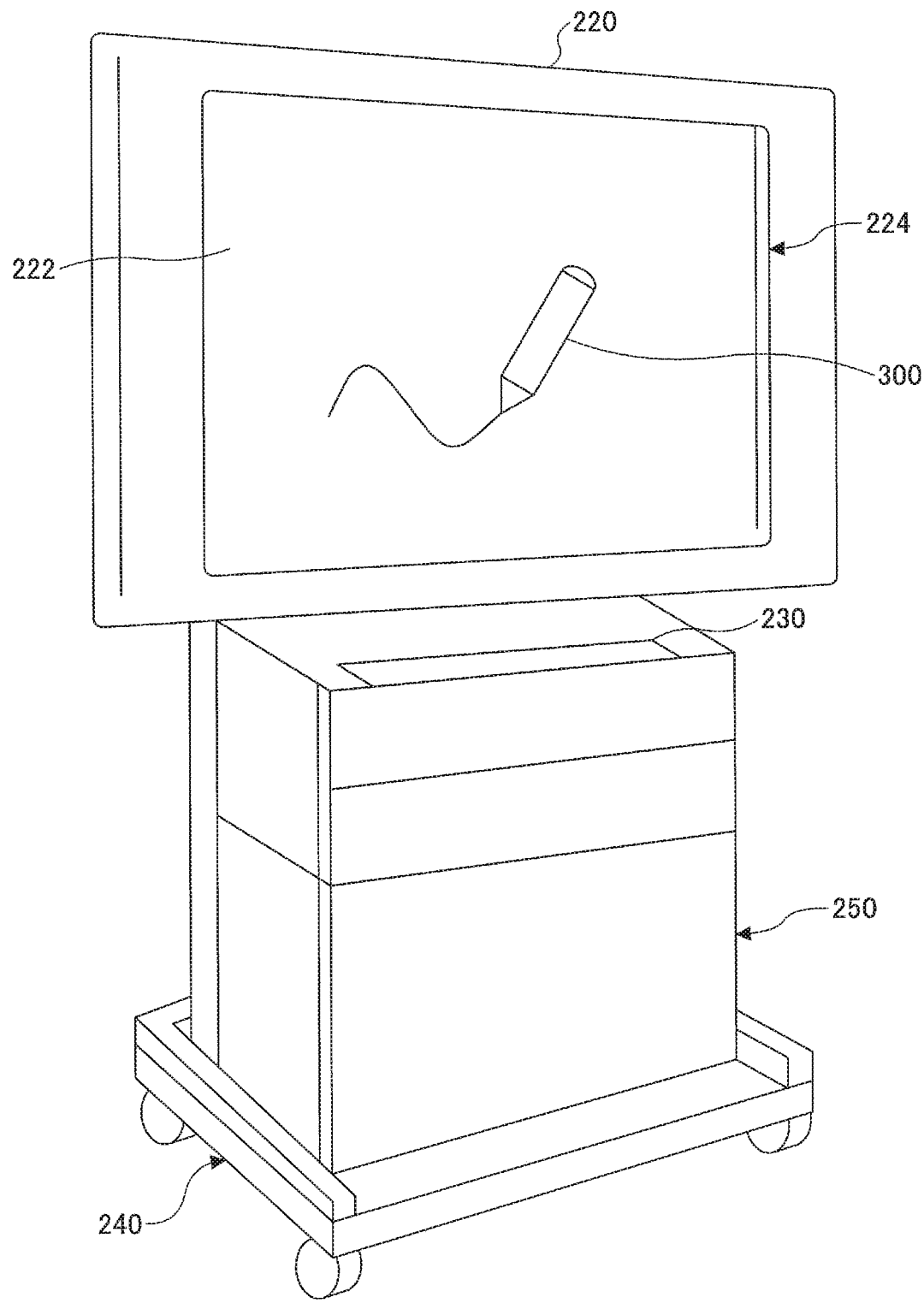
FIG. 2 is an external view of an interactive whiteboard of the embodiment.

Next, a hardware configuration of the present embodiment will be described. FIG. 2 is an external view of the IWB 20 of the embodiment. As illustrated in FIG. 2, the IWB 20 includes a display 220, a stand 240, and a device storage part 250. The display 220 includes a flat panel such as a liquid crystal display or a plasma display panel. In front of a casing of the display 220, a display surface 222 for image displays and a touch panel 224 are provided.

In an input apparatus 300, a signal transmitting apparatus is provided. When the nib of the input apparatus 300 comes into contact with the display surface 222, the signal transmitting apparatus transmits a writing detection signal (contact detection signal), which is a radio signal. When the writing detection signal transmitted by the input apparatus is received by the IWB 20, the display 220 displays characters, figures, and the like written at a coordinate position detected by the touch panel 224. The device storage part 250 stores various devices such as a main body of the IWB 20, for example. In addition, on the top side of the device storage part 250, a keyboard 230 is installed with which an input operation is performed.

Further, both the relay apparatus 30 and the management system 50 have the same external appearance as that of a generic server computer. Therefore, descriptions of the external appearance of the relay apparatus 30 and the management system 50 will be omitted.

Figure 3:
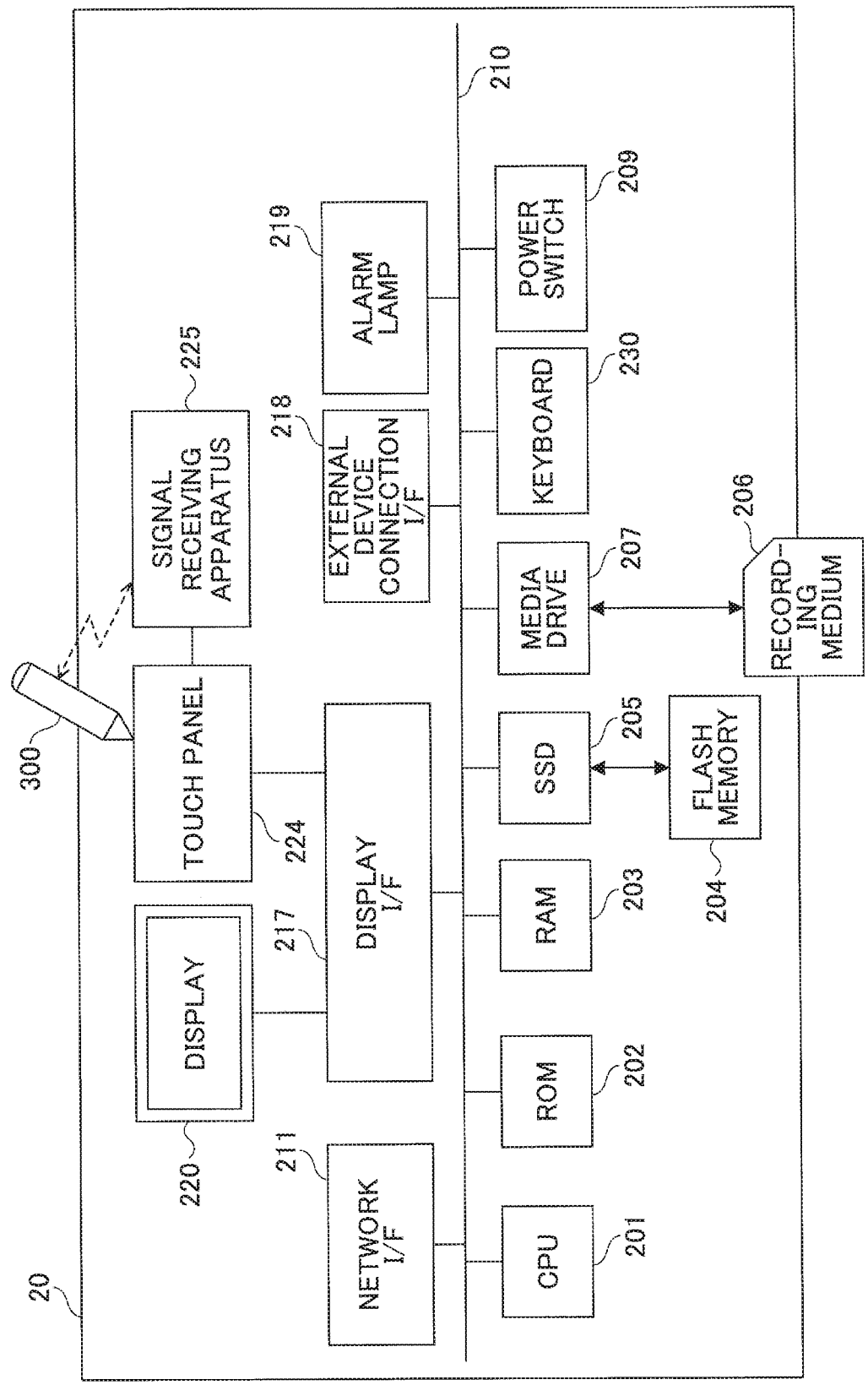
FIG. 3 is a hardware configuration diagram of the interactive whiteboard of the embodiment.

Next, referring to FIG. 3, a hardware configuration of the IWB 20 will be described. FIG. 3 is a hardware configuration diagram of the IWB 20 of the present embodiment. The IWB 20 of the present embodiment includes a central processing unit (CPU) 201 that controls the overall operation of the IWB 20, read-only memory (ROM) 202 that stores programs used to drive the CPU 201 such as an initial program loader (IPL), random-access memory (RAM) used as a work area for the CPU 201, flash memory 204 that stores various types of programs and various types of data, a solid-state drive (SSD) 205 that controls reading/writing of various data from/to the flash memory 204 according to the control of the CPU 201, a media drive 207 that controls reading/writing (storage) of data from/to a recording medium 206 such as flash memory, a power switch 209 for turning on and off the power of the IWB 20, and a network interface (I/F) 211 for data transmission via the communication network 2. Further, the recording medium 206 is removable from the IWB 20. Also, non-volatile memory that reads or writes data according to the control of the CPU 201 is not limited to the flash memory 204, and electrically erasable and programmable ROM (EEPROM) and the like may be used.

For example, the display 220 includes a liquid crystal display and an organic electroluminescence display for displaying images. Also, the IWB 20 is provided with a signal receiving apparatus 225 that receives a contact detection signal transmitted from the input apparatus 300 and outputs the contact detection signal to the touch panel 224. A touch panel driver, which is a control circuit of the touch panel 224, recognizes an input operation based on the contact detection signal transmitted from the input apparatus 300 and outputs stroke data corresponding to the input operation performed on the input apparatus 300. Once the input operation is recognized, the display 220 built in the IWB 20 superimposes and outputs images based on stroke data output by the touch panel driver or based on stroke data transmitted from another IWB 20 via the communication network 2.

Also, the IWB 20 includes a display I/F 217 for transmitting data output to the display 220 or transmitting data input from the touch panel 224 according to the control of the CPU 201, an external device connection I/F 218 for connecting various external devices to the IWB 20, an alarm lamp 219 for notifying a user of an abnormality of each function of the IWB 20, and a bus line 210 such as an address bus and a data bus for electrically connecting the above-described elements as illustrated in FIG. 3. External devices such as an external camera, an external microphone, or an external speaker can be electrically connected to the external device connection I/F 218 via, for example, a universal serial bus (USB) cable. Also, the IWB 20 includes the keyboard 230. The IWB 20 can receive an input based on an operation of the keyboard 230 by a user.

Further, the IWB 20 may be provided with a hardware configuration that is not illustrated in FIG. 3, depending on the function. Moreover, a part of the hardware configuration illustrated in FIG. 3 is not required to be provided.

Figure 4:
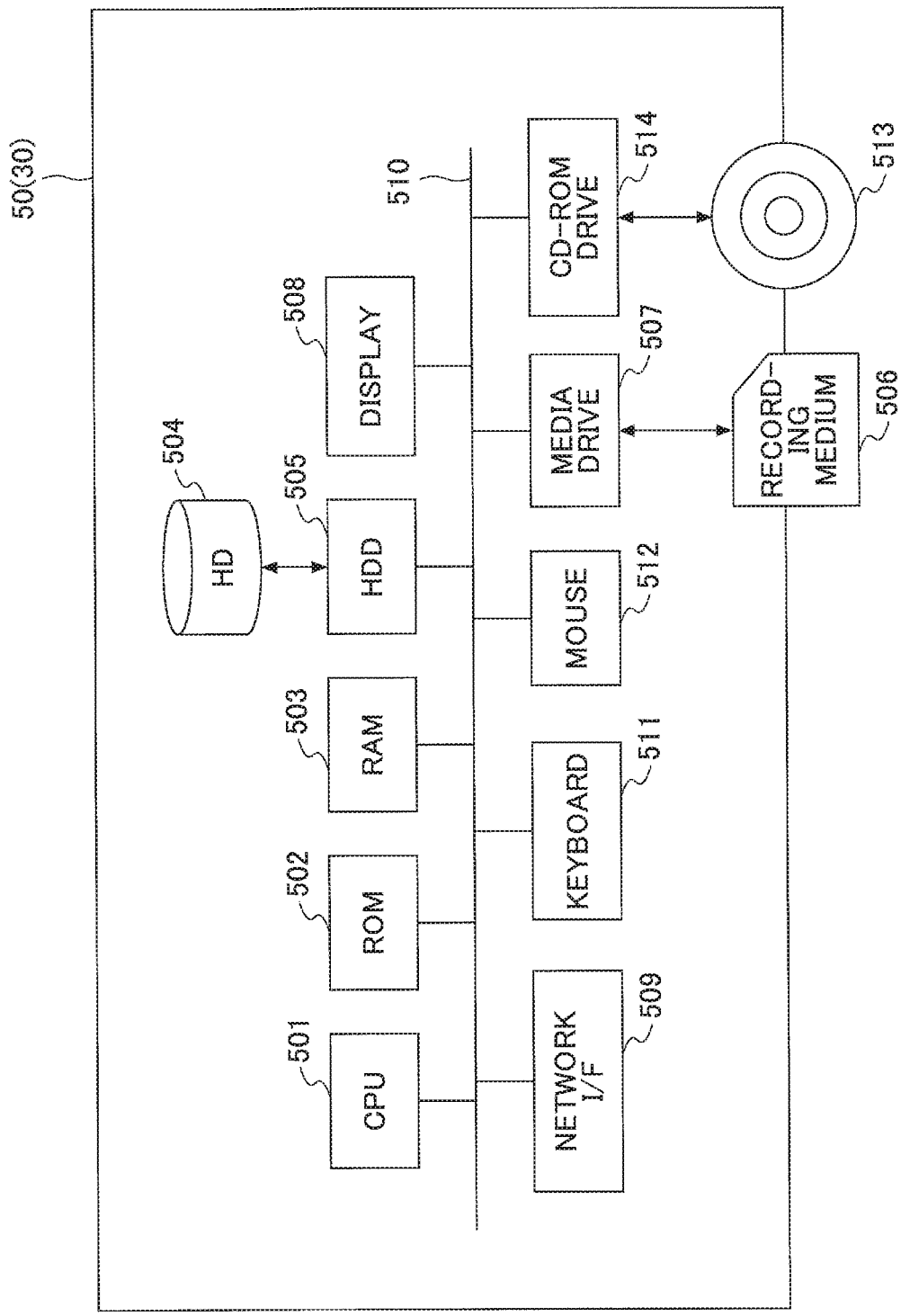
FIG. 4 is a hardware configuration diagram of a management system or a relay apparatus of the embodiment.

FIG. 4 is a hardware configuration diagram of the management system 50 of the embodiment. The management system 50 of the present embodiment includes a CPU 501 that controls the overall operation of the management system 50, ROM 502 that stores programs used to drive the CPU 501 such as an IPL, RAM 503 used as a work area for the CPU 501, a hard disk (HD) 504 that stores programs for the management system 50 or various types of data, a hard disk drive (HDD) 505 that controls reading/writing of various types of data from/to the HD 504 according to the control of the CPU 501, and a media drive 507 that controls reading/writing (storage) of data from/to a recording medium 506 such as flash memory. The management system 50 of the present embodiment further includes a display 508 that displays various types of information such as a cursor, menus, windows, characters, or images, a network I/F 509 for data communication via the communication network 2, a keyboard 511 equipped with a plurality of keys for inputting characters, numbers, various types of instructions, and the like, a mouse 512 for, for example, selecting or executing various types of instructions, selecting an object to be processed, and moving the cursor, a compact disc read-only memory (CD-ROM) drive 514 that controls reading/writing of various types of data from/to a CD-ROM 513 serving as an example of a removable recording medium, and a bus line 510 such as an address bus and a data bus for electrically connecting the above-described elements as illustrated in FIG. 4.

The hardware configuration of the relay apparatus 30 is same as the hardware configuration of the management system 50, and thus a description thereof will be omitted.

<<Functional Configuration of Embodiment>>

Figure 5:
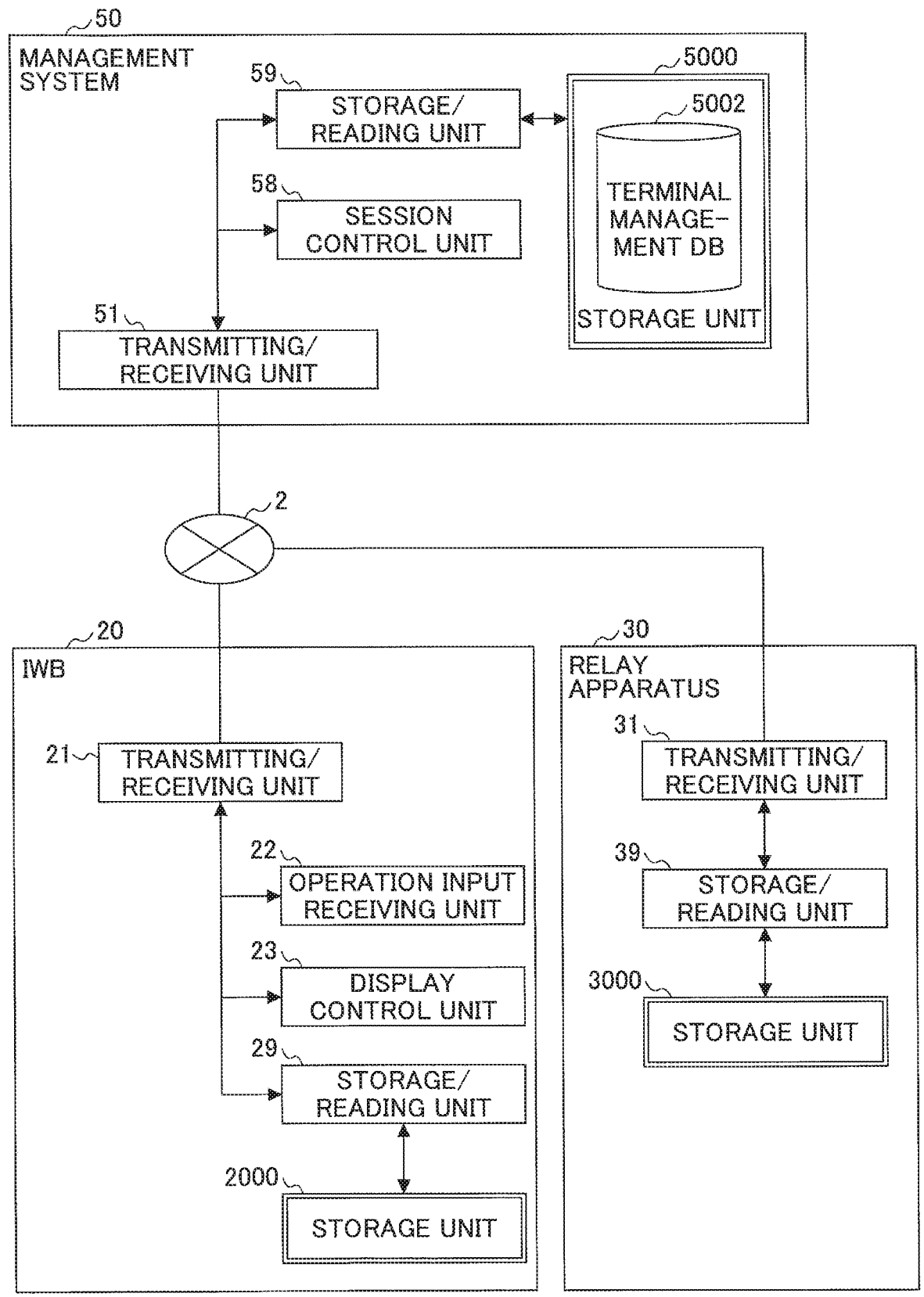
FIG. 5 is a functional block diagram of the interactive whiteboard, the relay apparatus, and the management system of the embodiment.

Next, a functional configuration of the present embodiment will be described. FIG. 5 is a functional block diagram of the IWB 20, the relay apparatus 30, and the management system 50 of the communication system 1 of the present embodiment. In FIG. 5, the IWB 20, the relay apparatus 30, and the management system 50 are connected to one another via the communication network 2 so as to enable data communication.

<Functional Configuration of IWB>

The IWB 20 of the present embodiment includes a transmitting/receiving unit 21, an operation input receiving unit 22, a display control unit 23, and a storage/reading unit 29. Any of the elements illustrated in FIG. 3 is operated in response to an instruction from the CPU 201 in accordance with a program loaded from the flash memory 204 into RAM 203. As a result, the functions of the above-described units are implemented. Also, the IWB 20 includes a storage unit 2000. The storage unit 2000 is configured with the ROM 202, the RAM 203, and the flash memory 204.

[Functional Configuration of IWB]

Next, each functional configuration of the IWB 20 will be described in detail.

The transmitting/receiving unit 21 is operated by an instruction from the CPU 201 and the network I/F 211. The transmitting/receiving unit 21 transmits/receives various types of data (or information) to/from a terminal, each apparatus, a system, or the like of the other communication partner via the communication network 2.

The operation input receiving unit 22 is operated by an instruction of the CPU 201, the touch panel 224, the power switch 209, and the keyboard 230. The operation input receiving unit 22 receives various types of inputs and various types of selections made by the user.

The display control unit 23 is operated by an instruction of the CPU 201 and the display I/F 217. The display control unit 23 controls transmission of stroke data to the display 220.

The storage/reading unit 29 is operated by an instruction of the CPU 201 and the SSD 205. The storage/reading unit 29 performs processing for storing various types of data in the storage unit 2000. Alternatively, the storage/reading unit 29 performs processing for extracting the various types of data stored in the storage unit 2000.

[Functional Configuration of Relay Apparatus]

The relay apparatus 30 includes a transmitting/receiving unit 31 and a storage/reading unit 39. Any of the elements illustrated in FIG. 4 is operated in response to an instruction from the CPU 501, in accordance with a program for the relay apparatus 30 loaded from the HD 504 into the RAM 503. As a result, the functions or parts of the respective units are implemented. Also the relay apparatus 30 includes a storage unit 3000. The storage unit 3000 is configured with the HD 504.

[Functional Configuration of Relay Apparatus]

Next, each functional configuration of the relay apparatus 30 will be described in detail.

The transmitting/receiving unit 31 of the present embodiment is operated by an instruction from the CPU 501 and the network I/F 509. The transmitting/receiving unit 31 transmits/receives various types of data (or information) from/to a terminal, each apparatus, a system, or the like of the other communication partner via the communication network 2.

The storage/reading unit 39 is operated by an instruction from the CPU 501 and a HDD 505. The storage/reading unit 39 performs processing for storing various types of data in the storage unit 3000. Alternatively, the storage/reading unit 39 performs processing for extracting the various types of data stored in the storage unit 3000.

<Functional Configuration of Management System>

The management system 50 includes a transmitting/receiving unit 51, a session control unit 58, and a storage/reading unit 59. Any of the elements illustrated in FIG. 4 is operated in response to an instruction from the CPU 501, in accordance with a program for the management system 50 loaded from the HD 504 into the RAM 503. As a result, the functions or parts of the respective units are implemented. Also, the management system 50 includes a storage unit 5000 configured with the HD 504. The storage unit 5000 stores databases (DBs) that includes tables, respectively, which will be described later.

[Terminal Management Table]

The storage unit 5000 is provided with a terminal management DB 5002 that includes a terminal management table. Table 1 is a conceptual diagram illustrating the terminal management table. In the terminal management table, a communication ID for identifying the IWB 20 of a communication destination is managed in association with a location name. Such a communication ID is not particularly limited and may be any information capable of identifying the IWB 20 of the communication destination. For example, communication IDs include information for identifying an IWB 20, an account name of a user of an IWB 20, and the like. In a case where the communication ID is an account name, the account name transmitted in response to a login request from an IWB 20 to the management system 50 and identification information of the IWB 20, from which the login is requested, may be managed in association with each other in the management system 50. In this way, the management system 50 can identify the IWB 20 by using the account name. Hereinafter, the communication IDs of the IWBs (20a, 20b, and 20c) will be described as being "02a, 02b, and 02c," respectively. A location name is name information such as a name of a place or a name of a business place, with which the user can identify the other communication partner. Location names in the terminal management table can be updated by the management system 50 in response to a request from the IWB 20 based on the user's operation input.

TABLE 1

| COMMUNICATION ID | LOCATION NAME |
|---|---|
| 02a | TOKYO |
| 02b | OSAKA |
| 02c | NEW YORK |
| ... | ... |

[Functional Configuration of Management System]

Next, each functional configuration of the management system 50 will be described in detail.

The transmitting/receiving unit 51 of the present embodiment is operated by an instruction from the CPU 501 and the network I/F 509. The transmitting/receiving unit 51 transmits/receives various types of data (or information) to/from respective terminals, apparatuses, and systems via the communication network 2.

The session control unit 58 is operated by an instruction from the CPU 501. The session control unit 58 controls sessions for transmitting stroke data between IWBs 20. The above-described control includes control for establishing a session, control for causing an IWB 20 to participate in the established session, and control for disconnecting the session.

The storage/reading unit 59 is operated by an instruction from the CPU 501 and the HDD 505. Alternatively, the storage/reading unit 59 is operated by an instruction from the CPU 501. The storage/reading unit 59 performs processing for storing various types of data in the storage unit 5000, or performs processing for extracting the various types of data stored in the storage unit 5000.

<<Processing or Operations of Embodiment>>

Next, processing or operations of the IWB 20, the relay apparatus 30, and the management system 50 of the communication system 1 will be described.

Figure 6:
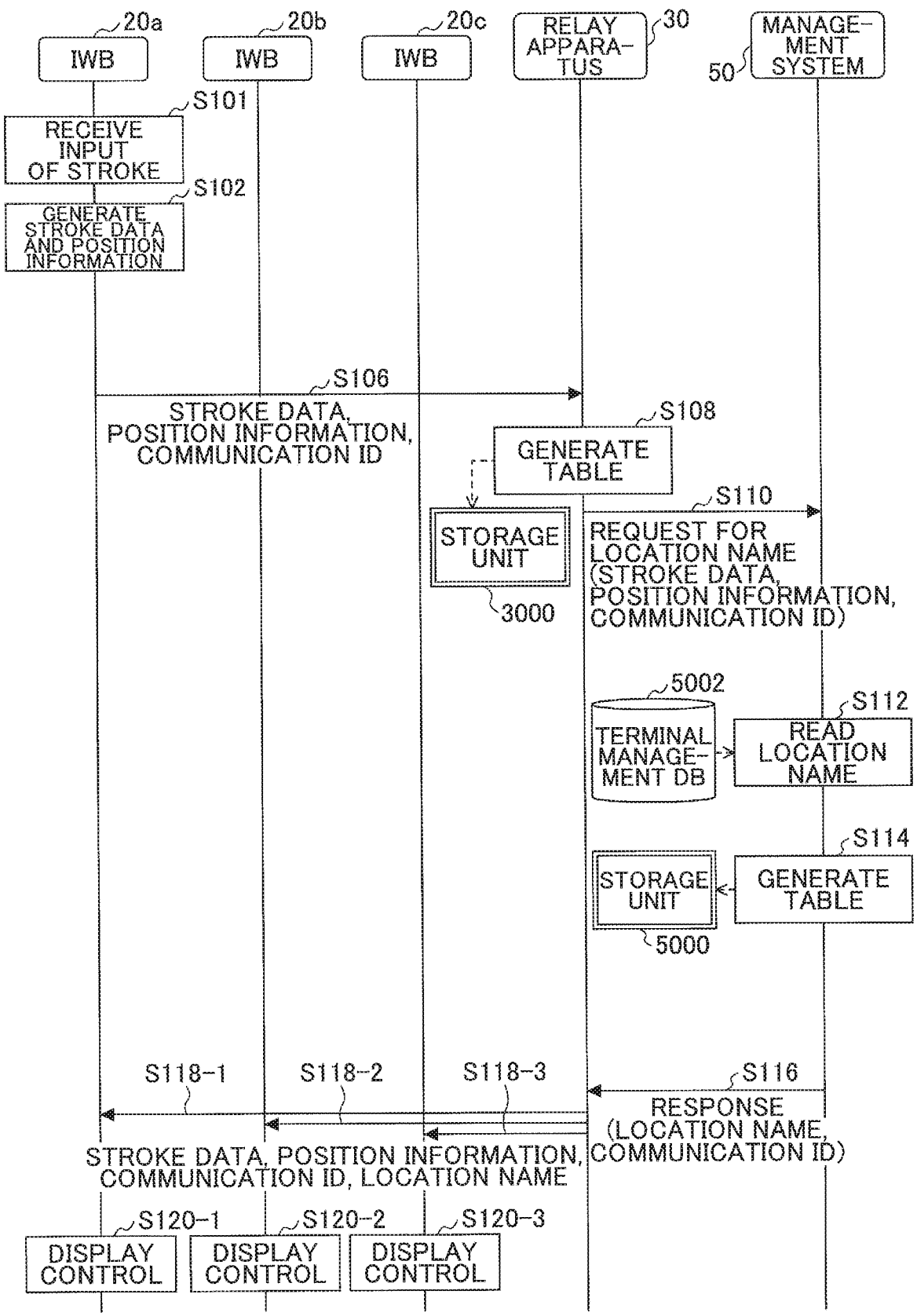
FIG. 6 is a sequence diagram illustrating an example of processing for transmitting stroke data between the interactive whiteboards.

The management system 50 establishes a session for transmitting stroke data via the relay apparatus 30 between the IWBs (20*a*, 20*b*, and 20*c*) according to the control of the session control unit 58. Hereinafter, the processing for transmitting stroke data between the IWBs 20 after the session is established will be described. FIG. 6 is a sequence diagram illustrating the processing for transmitting stroke data between the IWB 20.

When a user of the IWB 20*a* brings the nib of the input apparatus 300 into contact with the input apparatus 300, the input apparatus 300 transmits a contact detection signal. When the contact detection signal is received by the signal receiving apparatus 225, the touch panel 224 serving as the operation input receiving unit 22 detects coordinates of the contact position and receives an operation input of a stroke (step S101).

The operation input receiving unit 22 that has received the operation input of the stroke generates stroke data indicating the stroke entered and also generates position information indicating the position of the stroke on the display surface 222 (step S102). The position information is not particularly limited, and may be coordinates of a starting point and coordinates of an ending point of the stroke. Alternatively, when the stroke is assumed to be an object, the position information may be coordinates of an upper edge, a lower edge, a right edge, a left edge, or a center point of the object.

The transmitting/receiving unit 21 transmits the stroke data and the position information generated in step S102 and also transmits the communication ID of the IWB 20*a*, which is of the same terminal, to the relay apparatus 30 (step S106). Because the session between the IWB 20*a* and the relay apparatus 30 has already been established, as long as the relay apparatus 30 can identify the transmission source of the stroke data without receiving the communication ID, the IWB 20*a* is not required to transmit the communication ID in step S106.

Further, the transmitting/receiving unit 21 of the IWB 20 of an embodiment may at any time transmit, to the relay apparatus 30, the stroke data generated before the operation input is completed in step S101, that is, while the operation input receiving unit 22 is receiving the operation input. In this case, the location name can be displayed on the display surface 222 at a point at which the user starts the input (starts the writing). This enhances usability.

The transmitting/receiving unit 21 of the IWB 20 of another embodiment may transmit the stroke data to the relay apparatus 30 after the operation input is completed in step S101. In this case, the position information about the completed stroke can be transmitted to the relay apparatus 30. Therefore, in the later processing, it is possible to avoid the entire display of the stroke from overlapping with the display of the location name on the display surface 222. This enhances legibility of the stroke or the location name.

The storage/reading unit 39 of the relay apparatus 30 generates an image management table in which the communication ID, the stroke data, and the position information received are associated with one another, and the storage/reading unit 39 of the relay apparatus 30 stores the image management table in the storage unit 3000 (step S108). Table 2 is a conceptual diagram illustrating the image management table generated by the relay apparatus 30. Also, the storage/reading unit 39 may record identification information (ID) of stroke data or a file name of stroke data in the stroke data field of the image management table, and may store the corresponding stroke data in any other storage space of the storage unit 3000.

TABLE 2

| COMMUNICATION ID | STROKE DATA | POSITION INFORMATION |
|---|---|---|
| 02a | STROKE DATA 1 | (100, 100) |
| . . . | . . . | . . . |

The transmitting/receiving unit 31 of the relay apparatus 30 transmits the stroke data, the position information, and the communication ID transmitted from the IWB 20*a*, and requests the management system 50 for a location name of the IWB 20*a* (step S110).

In the management system 50 that has received the request for the location name, the storage/reading unit 59 searches the terminal management table (see Table 1) with the communication ID included in the request for the location name as a search key, and reads the location name corresponding to the communication ID (step S112).

The storage/reading unit 59 generates an image management table in which the communication ID, the stroke data, and the position information included in the request for the location name and the location name read in step S112 are associated with one another, and the storage/reading unit 59 stores the image management table in the storage unit 5000 (step S114). Table 3 is a conceptual diagram illustrating the image management table generated by the management system 50. The storage/reading unit 59 may record identification information (ID) of stroke data or a file name of stroke data in the stroke data field of the image management table, and may store the corresponding stroke data in any other storage space of the storage unit 5000.

TABLE 3

| COMMUNI- CATION ID | STROKE DATA | POSITION INFORMATION | LOCATION NAME |
|---|---|---|---|
| 02a | STROKE DATA 1 | (100, 100) | TOKYO |
| . . . | . . . | . . . | . . . |

As a response to the request for the location name, the transmitting/receiving unit 51 of the management system 50 transmits the communication ID of the IWB 20*a* and the location name read in step S112 to the relay apparatus 30, which is the source of the request (step S116).

In the relay apparatus 30 that has received the response, the transmitting/receiving unit 31 transmits the stroke data, the position information, and the communication ID transmitted from the IWB 20*a* and also the location name included in the response to the respective IWBs (20*a*, 20*b*, and 20*c*) participating in the session for transmitting the stroke data (steps S118-1, S118-2, and S118-3).

The respective display control units 23 of the IWBs (20a, 20b, and 20c) perform control that displays an image on the display 220 based on the stroke data, the position information, and the location name transmitted from the relay apparatus 30 (steps S120-1, S120-2, and S120-3). In this case, the display control unit 23 performs control that displays the stroke based on the stroke data at a position on the display surface 222 indicated by the position information. Also, the display control unit 23 performs control that displays the location name at a position on the display surface 222 corresponding to the above-described position information. For example, a position corresponding to position information includes a position of coordinate values that are calculated by adding or subtracting a given value to or from the coordinate values indicated by the position information or by multiplying or dividing a given value by the coordinate values indicated by the position information. Accordingly, the location name is displayed near the stroke.

The processing performed when the input of the stroke is received by the IWB 20a has been described above. When the IWB 20b receives an input of a stroke, the same processing as that of the IWB 20a is performed, except that the description of the IWBs (20a, 20b, and 20c) is changed to the IWBs (20b, 20c, and 20a). Therefore, a detailed description thereof will be omitted. Similarly, when the IWB 20c receives an input of a stroke, the same processing as that of the IWB 20a is performed, except that the description of the IWBs (20a, 20b, and 20c) is changed to the IWBs (20c, 20a, and 20b). Therefore, a detailed description thereof will be omitted.

Figure 7A:
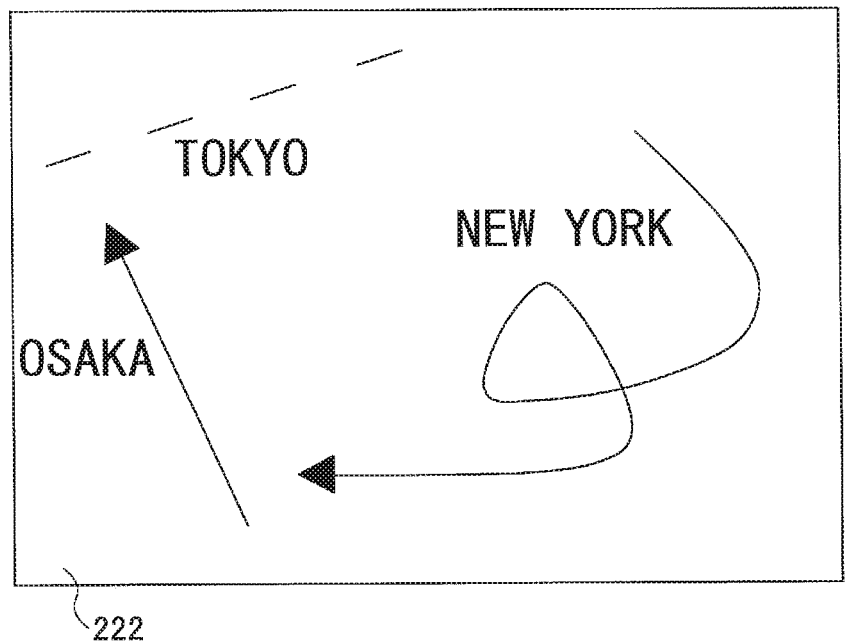
FIG. 7A is a diagram illustrating an example of a displayed image of the embodiment.

The processing of the above-described steps S101 through S120-1, S120-2, and S120-3 is performed each time a stroke is input into the IWBs (20a, 20b, and 20c). Such a series of processing allows the respective IWBs (20a, 20b, and 20c) to display a location name in association with the stroke input into the IWB 20. FIG. 7A is a diagram illustrating an example of the display of the IWB 20.

<First Variation of Embodiment>

Next, a first variation of the embodiment will be described.

Figure 8:
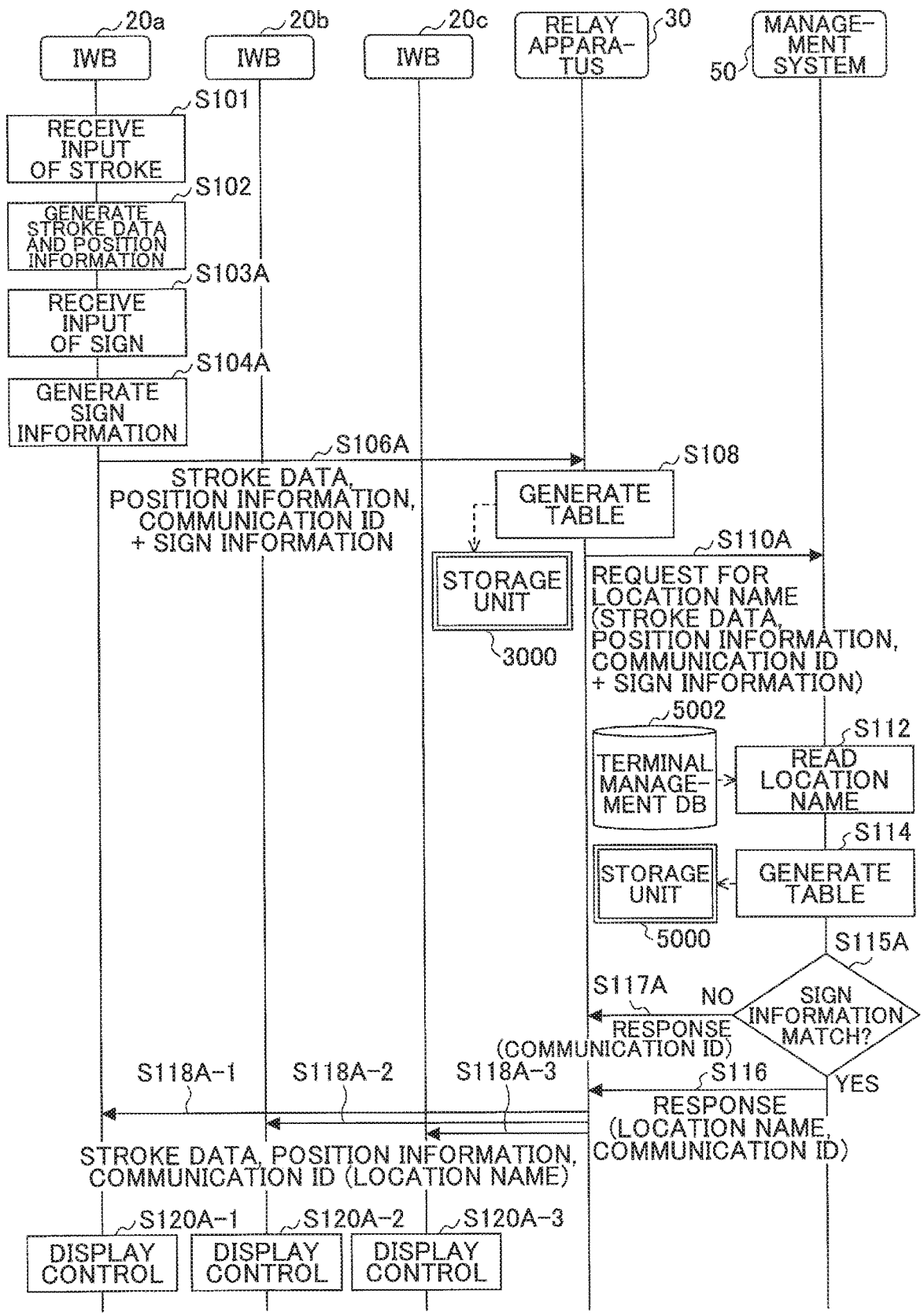
FIG. 8 is a sequence diagram illustrating another example of the processing for transmitting stroke data between the interactive whiteboards.

By referring to FIG. 8, differences between the first variation of the embodiment and the above-described embodiment will be described. FIG. 8 is a sequence diagram illustrating the processing for transmitting stroke data between the IWBs 20. In the first variation, the storage unit 5000 of the management system 50 is provided with the terminal management DB 5002 that includes a terminal management table illustrated in Table 4. Table 4 is a conceptual diagram illustrating the terminal management table. The terminal management table manages communication IDs identifying IWBs 20, location names, and sign information indicating signs for users in association with one another. The signs are not particularly limited, and include symbols, ciphers, and names. The sign information is not particularly limited, and may be stroke data, text data, or image data.

TABLE 4

| COMMUNICATION ID | LOCATION NAME | SIGN INFORMATION |
|---|---|---|
| 02a | TOKYO | ☆ |
| 02b | OSAKA | Δ |
| 02c | NEW YORK | * |
| ... | ... | ... |

Figure 7B:
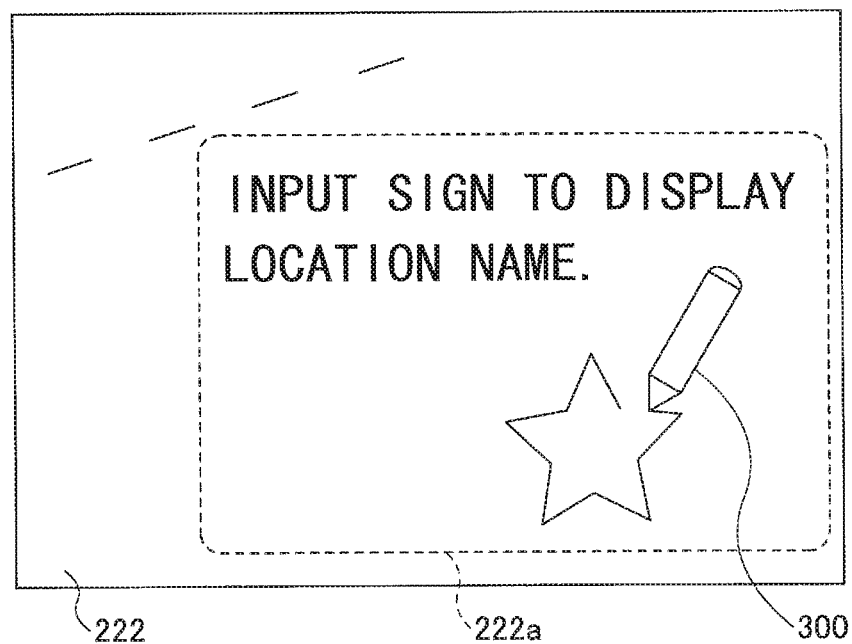
FIG. 7B is a diagram illustrating an example of a displayed image of a variation of the embodiment.

FIG. 7B is a conceptual diagram illustrating an example of the display. When the operation input receiving unit 22 receives an operation input of a stroke, the display control unit 23 displays a pop-up screen 222a on a part of the display surface 222, requesting a user to input a sign. Accordingly, the operation input receiving unit 22 receives the input of the sign (step S103A). When the sign is input, the operation input receiving unit 22 generates sign information indicating the input sign (step S104A).

The transmitting/receiving unit 21 of the IWB 20a transmits, together with the stroke data and the position information generated in step S102, in addition to the communication ID of the terminal, the sign information generated in step S104A to the relay apparatus 30 (step S106A).

The transmitting/receiving unit 31 of the relay apparatus 30 transmits, to the management system 50, the stroke data, the position information, the communication ID, and the sign information transmitted from the IWB 20a, and requests the management system 50 for a location name (step S110A).

The session control unit 58 of the management system 50 determines whether the sign information included in the request for the location name matches sign information managed in the terminal management table (see Table 4) in association with the communication ID included in the request for the location name (step S115A). In this case, the session control unit 58 may calculate the matching rate of the two pieces of sign information. The session control unit 58 may determine that the two signs match when the matching rate exceeds a predetermined threshold, and may determine that the two signs do not match when the matching rate is equal to or less than the predetermined threshold. In step S115A, when the two signs are determined to match, the transmitting/receiving unit 51 transmits a response that includes the location name read in step S112 to the relay apparatus 30 (step S116). In step S115A, when the two signs are determined not to match, the transmitting/receiving unit 51 transmits a response that does not include the location name to the relay apparatus 30 (step S117A).

The transmitting/receiving unit 31 of the relay apparatus 30 transmits, to the IWBs (20a, 20b, and 20c), the stroke data, the position information, and the communication ID transmitted from the IWB 20a (steps S118A-1, S118A-2, and S118A-3). When the location name is included in the response transmitted from the management system 50, the transmitting/receiving unit 31 of the relay apparatus transmits the location name included in the response, together with the above-described stroke data, the position information, and the communication ID.

The respective display control units 23 of the IWBs (20a, 20b, and 20c) perform control that displays a stroke based on the stroke data and the position information transmitted from the relay apparatus 30 (steps S120A-1, S120A-2, and S120A-3). When the location name is transmitted together with the stroke data and the position information from the relay apparatus 30, the display control unit 23 performs control that displays the location name at a position corresponding to the position information. Accordingly, the location name associated with the stroke can be displayed only when an authorized user inputs a sign.

<Second Variation of Embodiment>

Next, a second variation of the embodiment will be described.

Figure 9:
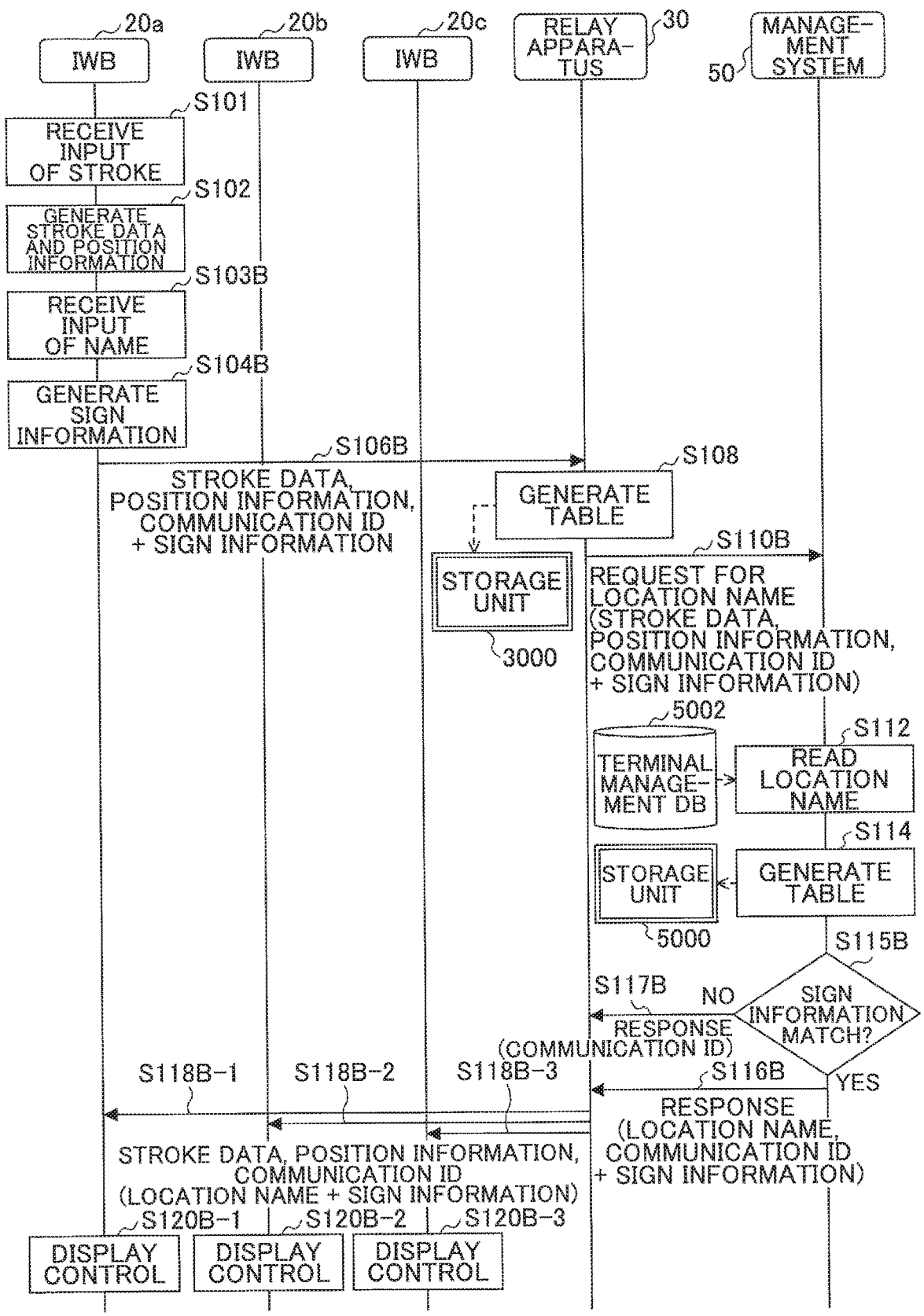
FIG. 9 is a sequence diagram illustrating yet another example of the processing for transmitting stroke data between the interactive whiteboards.

By referring to FIG. 9, differences between the second variation of the embodiment and the above-described embodiment will be described. FIG. 9 is a sequence diagram illustrating the processing for transmitting stroke data between the IWBs.

Figure 7C:
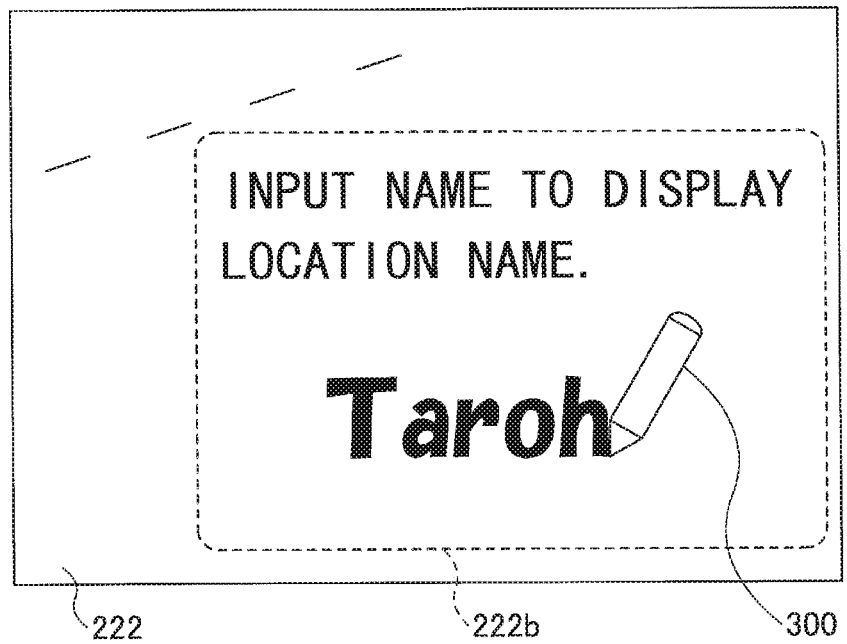
FIG. 7C is a diagram illustrating an example of a displayed image of another variation of the embodiment.

FIG. 7C is a conceptual diagram illustrating an example of the display. When the operation input receiving unit 22 receives an operation input of a stroke, the display control unit 23 displays a pop-up screen 222b on a part of the display surface 222, requesting a user to input a name as an example of signs described in the first variation. As a result, the operation input receiving unit 22 receives the input of the name (step S103B). When the name is input, the operation input receiving unit 22 generates sign information indicating the input name (step S104B).

The transmitting/receiving unit 21 of the IWB 20a transmits, together with the stroke data and the position information generated in step S102, in addition to the communication ID of the terminal, the sign information generated in step S104B to the relay apparatus 30 (step S106B).

The transmitting/receiving unit 31 of the relay apparatus 30 transmits, to the management system 50, the stroke data, the position information, the communication ID, and the sign information transmitted from the IWB 20a, and requests the management system 50 for a location name (step S110B).

The session control unit 58 of the management system 50 determines whether the sign information included in the request for the location name matches sign information managed in the terminal management table in association with the communication ID included in the request for the location name (step S115B).

In step S115B, when the sign information transmitted via the relay apparatus 30 from the IWB 20a is determined to match the sign information managed in the terminal management table, the transmitting/receiving unit 51 transmits a response that includes the location name read in step S112 and also includes the sign information transmitted from the IWB 20a to the relay apparatus 30 (step S116B). In step S115B, when the two pieces of sign information are determined not to match, the transmitting/receiving unit 51 transmits a response that does not include either the location name or sign information to the relay apparatus 30 (step S117B).

The transmitting/receiving unit 31 of the relay apparatus 30 transmits, to the IWBs (20a, 20b, and 20c), the stroke data, the position information, and the communication ID transmitted from the IWB 20a (steps S118B-1, S118B-2, and S118B-3).

When the location name and sign information are included in the response transmitted from the management system 50, the transmitting/receiving unit 31 of the relay apparatus 30 transmits the location name and the sign information included in the response, together with the above-described stroke data, the position information, and the communication ID.

Figure 7D:
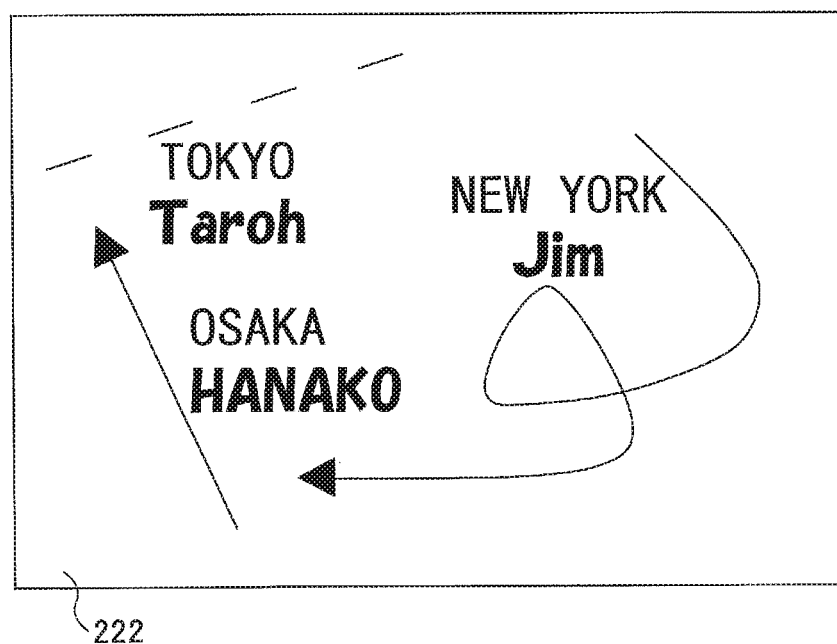
FIG. 7D is a diagram illustrating an example of a displayed image of another variation of the embodiment.

The respective display control units 23 of the IWBs (20a, 20b, and 20c) perform control that displays a stroke based on the stroke data and the position information transmitted from the relay apparatus 30 (steps S120B-1, S120B-2, and S120B-3). When the location name and the sign information are transmitted together with the stroke data and the position information from the relay apparatus 30, the display control unit 23 performs control that displays the location name and the sign information, namely a name, at a position corresponding to the position information. FIG. 7D is a diagram illustrating an example of the display 220 of the second variation. According to the second variation, the name input by an authorized user can be displayed in association with the stroke.

<Third Variation of Embodiment>

Next, a third variation of the embodiment will be described.

Figure 10:
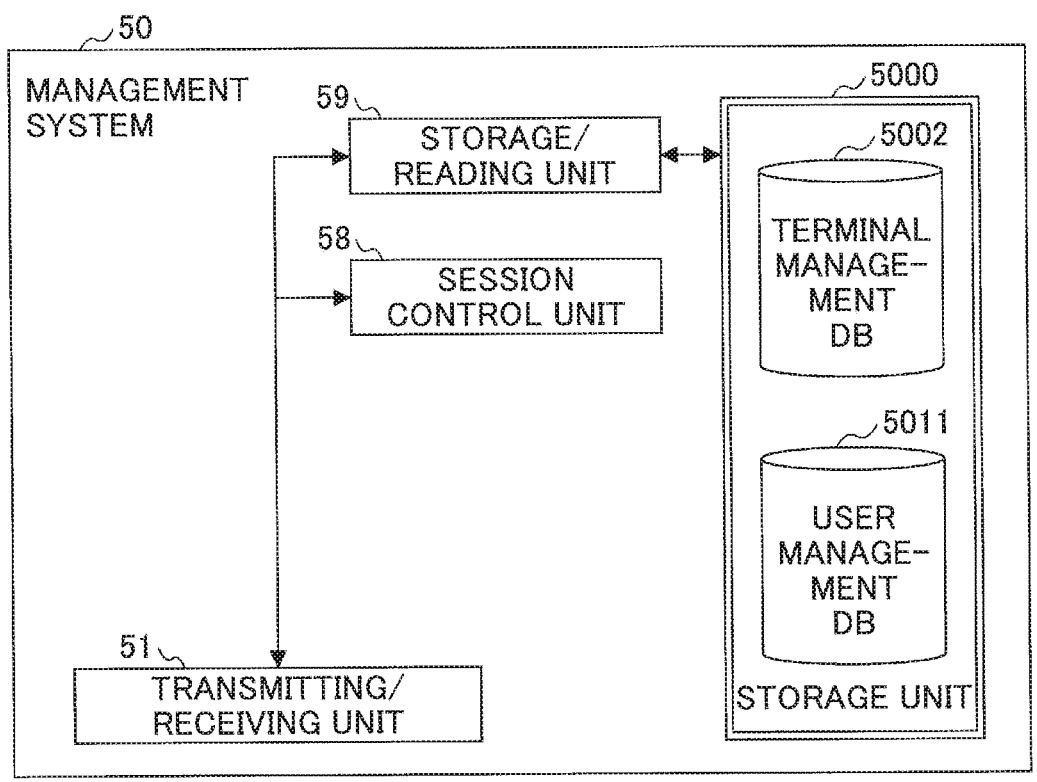
FIG. 10 is a hardware configuration diagram of the management system of the embodiment.
Figure 11:
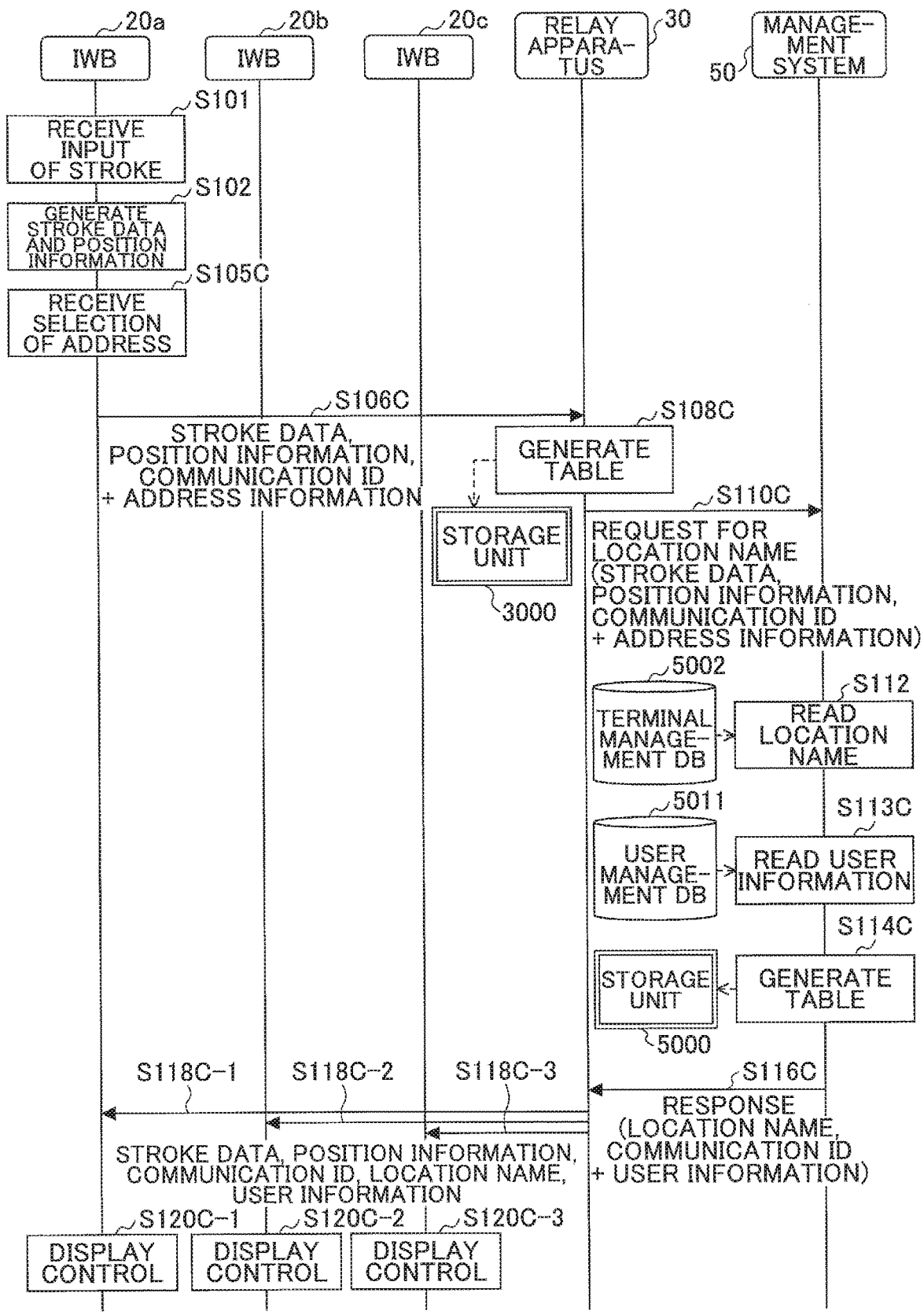
FIG. 11 is a sequence diagram illustrating another example of the processing for transmitting stroke data between the interactive whiteboards.

By referring to FIG. 10 and FIG. 11, differences between the third variation of the embodiment and the above-described embodiment will be described. FIG. 10 is a functional block diagram of the management system 50 according to the embodiment. FIG. 11 is a sequence diagram illustrating the processing for transmitting stroke data between the IWBs 20.

The storage unit 5000 of the management system 50 is provided with a user management DB 5011 that includes a user management table. Table 5 is a conceptual diagram illustrating the user management table. In the user management table, user IDs of IWB 20 users, address information of users, and user information that identifies users and that can be output from the IWB 20 are managed in association with one another. The user information includes text information such as user names or image information such as icons and thumbnails. In the user management table, names of text information files and image information files are also managed. The files identified by file names may be stored in a different storage space from the user management table of the storage unit 5000. Information managed in the user management table can be updated by the storage/reading unit 59 of the management system 50 in response to a request from the IWB 20 based on the user operation.

TABLE 5

| USER ID | ADDRESS INFORMATION | USER INFORMATION |
|---------|---------------------|------------------|
| aa | aa@ex.com | Taroh |
| ab | ab@ex.com | Jiroh.ico |
| ac | ac@ex.com | Sabroh.bmp |
| ba | ba@ex.com | Hanako.jpg |
| ca | ca@ex.com | Jim.ico |
| . . . | . . . | . . . |

Figure 7E:
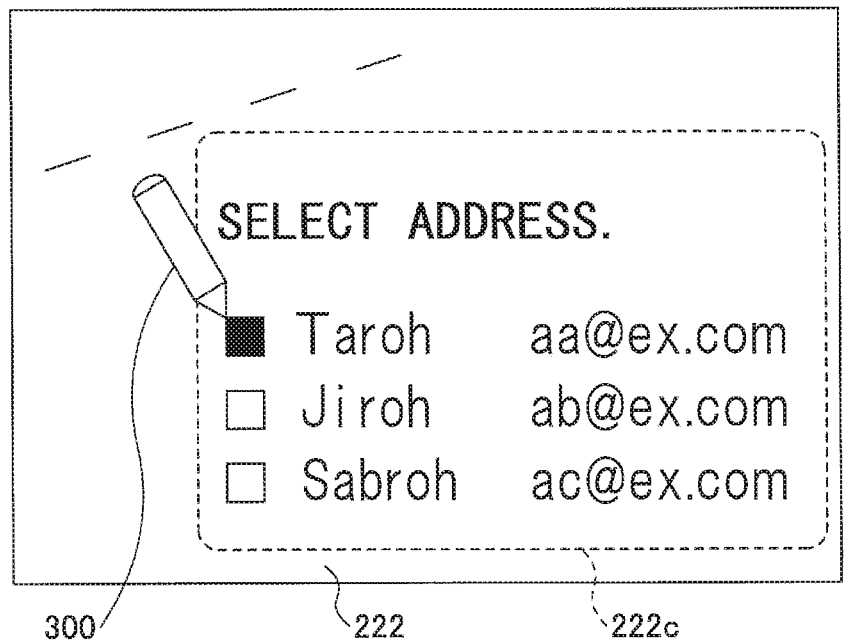
FIG. 7E is a diagram illustrating an example of a displayed image of yet another variation of the embodiment.

FIG. 7E is a conceptual diagram illustrating an example of the display. When the operation input receiving unit 22 of the IWB 20a receives a stroke input, the display control unit 23 displays a pop-up screen 222c on a part of the display surface 222. On the pop-up screen 222c a selection of an address is received. Address selections include respective addresses of a plurality of users of the IWB 20a. Such addresses are preliminarily stored in the storage unit 2000. Accordingly, the operation input receiving unit 22 receives the selection of the user's own address (step S105C).

The transmitting/receiving unit 21 of the IWB 20a transmits, together with the stroke data and the position information, in addition to the communication ID of the terminal, address information indicating the address selected in step S105C to the relay apparatus 30 (step S106C).

The storage/reading unit 39 of the relay apparatus 30 generates an image management table in which the communication ID, the stroke data, the position information, and the address information transmitted from the IWB 20a are associated with one another, and stores the image management table in the storage unit 3000 (step S108C). Table 6 is a conceptual diagram illustrating the image management table generated in step S108C.

TABLE 6

| COMMUNI-CATION ID | STROKE DATA | POSITION INFORMATION | ADDRESS INFORMATION |
|---|---|---|---|
| 02a | STROKE DATA 1 | (100, 100) | aa@ex.com |
| ... | ... | ... | ... |

The transmitting/receiving unit 31 of the relay apparatus 30 transmits, to the management system 50, the stroke data, the position information, the communication ID, and the address information transmitted from the IWB 20a, and requests the management system 50 for a location name (step S110C).

In the management system 50 that has received the request for the location name, the storage/reading unit 59 searches the user management table (see Table 5) with the address information included in the request for the location name as a search key, and reads the user information corresponding to the search key (step S113C).

The storage/reading unit 59 generates an image management table in which the communication ID, the stroke data, the position information, and the address information included in the request for the location name, and the location name and the user information read in the respective steps (S112 and S113C) are associated with one another, and stores the image management table in the storage unit 5000 (step S114C). Table 7 is a conceptual diagram illustrating the image management table generated in step S114C.

TABLE 7

| COMMUNI-CATION ID | STROKE DATA | POSITION INFORMATION | ADDRESS INFORMATION | LOCATION NAME | USER INFORMATION |
|---|---|---|---|---|---|
| 02a | STROKE DATA 1 | (100, 100) | aa@ex.com | TOKYO | Taroh |
| ... | ... | ... | ... | ... | ... |

As a response to the request for the location name, the transmitting/receiving unit 51 of the management system 50 transmits the communication ID of the IWB 20a and the location name and the user information read in the respective steps (S112 and S113C) to the relay apparatus 30, which is the source of the request (step S116C).

In the relay apparatus 30 that has received the response, the transmitting/receiving unit 31 transmits the stroke data, the position information, and the communication ID transmitted from the IWB 20a and also transmits the location name and the user information included in the response to the respective IWBs (20a, 20b, and 20c) participating in the session for transmitting the stroke data (steps S118C-1, S118C-2, and S118C-3).

Figure 7F:
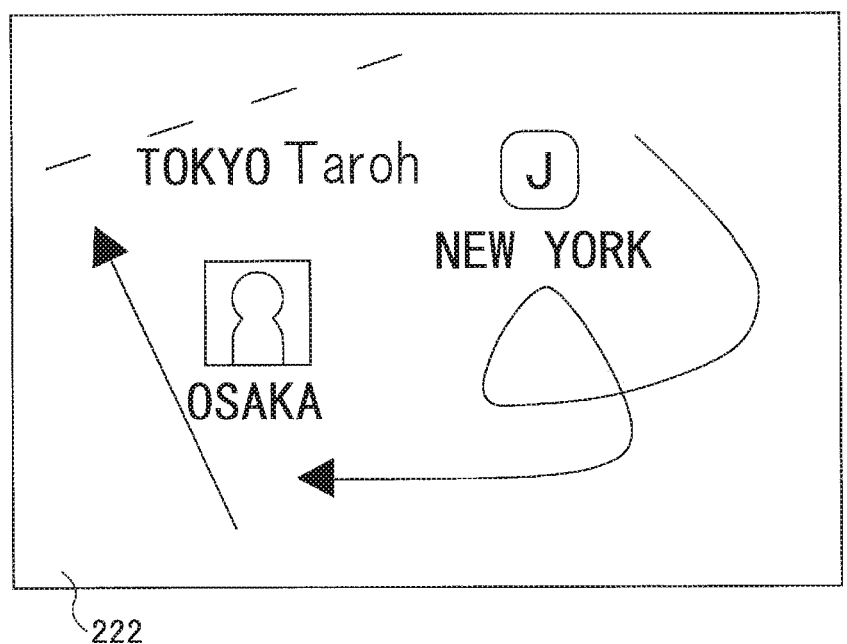
FIG. 7F is a diagram illustrating another example of a displayed image of yet another variation of the embodiment.

The respective display control units 23 of the IWBs (20a, 20b, and 20c) perform control that displays a stroke based on the stroke data and the position information transmitted from the relay apparatus 30 (steps S120C-1, S120C-2, and S120C-3). Also, the respective display control units 23 perform control that displays the location name at a position on the display surface 222 indicated by the position information. Further, the respective display control units 23 perform control that displays an image based on the user information at a position on the display surface 222 corresponding to the position information. Accordingly, the image based on the location name and the user information is displayed near the stroke. FIG. 7F is a diagram illustrating an example of the display of the third variation. According to the third variation, the user information such as texts, icons, and thumbnails associated with strokes can be displayed.

<<Main Effects of Embodiment>>

Next, main effects of the above-described embodiment will be described. An IWB 20 (an example of a communication terminal) is communicatively connected to at least one other IWB 20 via the communication network 2. The transmitting/receiving unit 21 (an example of a transmitting part) of the IWB 20 receives stroke data transmitted from the at least one other IWB 20. Also, the transmitting/receiving unit 21 (an example of an obtaining part) of the IWB 20 obtains a location name (an example of name information) that is associated with a communication ID of the other IWB 20, which is the transmission source of the stroke data, under management by the management system 50 on the communication network 2. The display control unit 23 (an example of a display control part) is configured to perform control that displays a stroke (an example of an image) based on the stroke data and the location name (an example of an image based on the name information) in association with each other. Accordingly, even without a name of a communication partner being managed by the IWB 20, it is possible to display the name in association with the stroke of the stroke data transmitted from the communication partner.

The operation input receiving unit 22 (an example of an operation input receiving part) of the IWB 20 receives an operation input by a user. The transmitting/receiving unit 21 (an example of a transmitting part) of the IWB 20 transmits the stroke data based on the above-described operation input to the at least one other IWB 20 via the relay apparatus 30. The transmitting/receiving unit 21 can transmit the stroke data while the operation input is being received. In this case, the location name can be displayed on the display surface 222 on the other communication partner side at a point at which the user starts the input (starts the writing). This enhances usability.

The transmitting/receiving unit 21 may transmit the stroke information after the operation input of the stroke is completed. In this case, the completed stroke can be transmitted to the relay apparatus 30. Therefore, in the later processing, it is possible to avoid the entire display of the stroke from overlapping with the display of the location name on the display surface 222. This enhances legibility of the stroke or the location name.

For respective communication IDs of IWBs 20, which are transmission sources of stroke data, the terminal management DB 5002 provided in the storage unit 5000 (an example of a managing part) of the management system 50 manages location names (an example of the name information) in association with the respective communication IDs. When the stroke data is transmitted to the above-described IWB 20 from another IWB 20, the storage/reading unit 59 (an example of an extracting part) reads (extracts) name information associated with the communication ID of the other IWB 20 from the terminal management DB 5002. The transmitting/receiving unit 51 (an example of a transmitting part) of the management system 50 transmits the extracted location name to the IWB 20. Accordingly, the above-described IWB 20 can obtain the location name of the transmission source of the stroke data.

For respective communication IDs of IWBs 20, which are transmission sources of stroke data, the terminal management DB 5002 manages sign information (first sign information) indicating signs of users in association with the respective communication IDs. When sign information (second sign information) is transmitted together with stroke data from another IWB 20, the session control unit 58 (an example of a determining part) determines whether the sign information transmitted from the other IWB 20 matches sign information managed in the terminal management DB 5002 in association with the communication ID of the other IWB 20.

When the session control unit 58 determines that the two pieces of sign information match, the transmitting/receiving unit 51 (an example of the transmitting part) of the management system 50 transmits the location name read by the storage/reading unit 59 to the IWB 20. Accordingly, the location name can be displayed on the IWB 20 when an authorized user inputs a stroke.

For respective pieces of address information of transmission sources of stroke data, the user management DB 5011 provided in the storage unit 5000 of the management system 50 manages user information (an example of user information) in association with the respective pieces of address information. When the address information is transmitted from another IWB 20, the storage/reading unit 59 of the management system 50 reads (extracts) user information associated with the address information transmitted from the other IWB 20 from the user management DB 5011. The transmitting/receiving unit 51 transmits the extracted user information to the IWB 20. Accordingly, in addition to the location name of the transmission source of the stroke data, the above-described IWB 20 can also obtain the user information of the user who is using the other IWB 20.

<<Supplement to Embodiment>>

Each program for the IWB 20 and the management system 50 may be recorded in a computer-readable recording medium (such as the recording medium 206) in an installable form or in an executable form, and may be distributed. Also, other examples of the above-described recording medium include Compact Disc-Recordable (CD-R), a digital versatile disc (DVD), and a Blu-ray disc. Further, the above-described recording medium or the HD 504 storing these programs may be provided as a program product domestically or abroad.

Moreover, the IWB 20 and the management system 50 according to the above-described embodiment may be implemented by a single apparatus or may be implemented by a plurality of apparatuses to which divided respective units (functions and parts) are assigned on a selectable basis.

Further, although the IWB 20 has been described above as an example of an image sharing apparatus, the present invention is not limited thereto. For example, the image sharing apparatus may be an electronic blackboard, a personal computer (PC) equipped with an image sharing function, and the like.

Further, although the conference making use of the image sharing apparatus (generic concept) such as the IWB 20 (specific concept) has been described above as an example, the present invention is not limited thereto. The present invention includes an application of the above-described embodiment in a field of communication as a wider concept including a video conference. For example, the above-described embodiment can be applied in a case where stroke data of an image output from a plurality of communication terminals is transmitted between a plurality of communication terminals of a projector system, digital signage, a text sharing system, a car navigation system, a communication system for gaming machines, and the like.

According to at least one embodiment, names of other communication partners can be flexibly displayed in association with strokes.

Further, the present invention is not limited to these embodiments, but various variations and modifications may be made without departing from the scope of the present invention.

What is claimed is:

1. A communication system, comprising:
   a communication terminal for communicative connection to another communication terminal, of a plurality of communication terminals, via a network; and
   a management system connected to the network,
   wherein the management system includes a memory to store user information in association with respective transmission sources of stroke data, the respective transmission sources having corresponding account information, and management circuitry configured to extract, from the memory, upon receiving particular stroke data and particular account information of a particular transmission source of the particular stroke data, particular user information that is associated with the particular account information; and
   wherein the communication terminal includes circuitry configured to
      receive, from the management circuitry, the particular stroke data, which is generated by and initially transmitted from the another communication terminal corresponding to the particular account information,
      receive, from the management circuitry, the extracted particular user information that is associated in the memory with the particular account information of the particular transmission source of the particular stroke data, and
      perform control that displays a first image generated based on the received particular stroke data and a second image generated based on the received particular user information, in association with each other.

2. The communication system of claim 1, wherein the circuitry is further configured to perform the control that displays the second image, which is an icon corresponding to the particular account information.

3. The communication system according to claim 1, wherein the communication terminal further includes an operation input receiver configured to receive an operation input, and a transmitter configured to transmit, to the another communication terminal, input stroke data based on the operation input, and
   wherein the transmitter is further configured to transmit the input stroke data while the operation input is being received by the operation input receiver.

4. The communication system according to claim 1, wherein the communication terminal further includes an operation input receiver configured to receive an operation input, and a transmitter configured to transmit, to the another communication terminal, input stroke data based on the operation input, and
   wherein the transmitter is further configured to transmit the input stroke data upon completion of reception of the operation input by the operation input receiver.

5. A method for controlling a communication system including a communication terminal for communicative connection to another communication terminal, of a plurality of communication terminals, via a network, and a management system connected to the network, and including a memory to store user information in association with respective transmission sources of stroke data, the respective transmission sources having corresponding account information and management circuitry configured to extract, from the memory, upon receiving particular stroke data and particular account information of a particular transmission source of the particular stroke data, particular user information that is associated with the particular account information, the method comprising:

- receiving, from the management circuitry, the particular stroke data, which is generated by and initially transmitted from the another communication terminal corresponding to the particular account information,
- receiving, from the management circuitry, the extracted particular user information that is associated in the memory with the particular account information of the particular transmission source of the particular stroke data, and
- performing control that displays a first image generated based on the received particular stroke data and a second image generated based on the received particular user information, in association with each other.

6. The method of claim 5, wherein the performing step includes performing the control that displays the second image, which is an icon corresponding to the particular account information.

7. The method of claim 5, further comprising receiving an operation input, and transmitting, to the another communication terminal, input stroke data based on the operation input,
- wherein the transmitting step further includes transmitting the input stroke data while the operation input is being received by the operation input receiver.

8. The method of claim 5, further comprising receiving an operation input, and transmitting, to the another communication terminal, input stroke data based on the operation input,
- wherein the transmitting step further includes transmitting the input stroke data upon completion of reception of the operation input by the operation input receiver.

9. A non-transitory recording medium storing a plurality of programs that, when executed, causes processing circuitry to perform the method of claim 5.

* * * * *